Patented Aug. 7, 1934

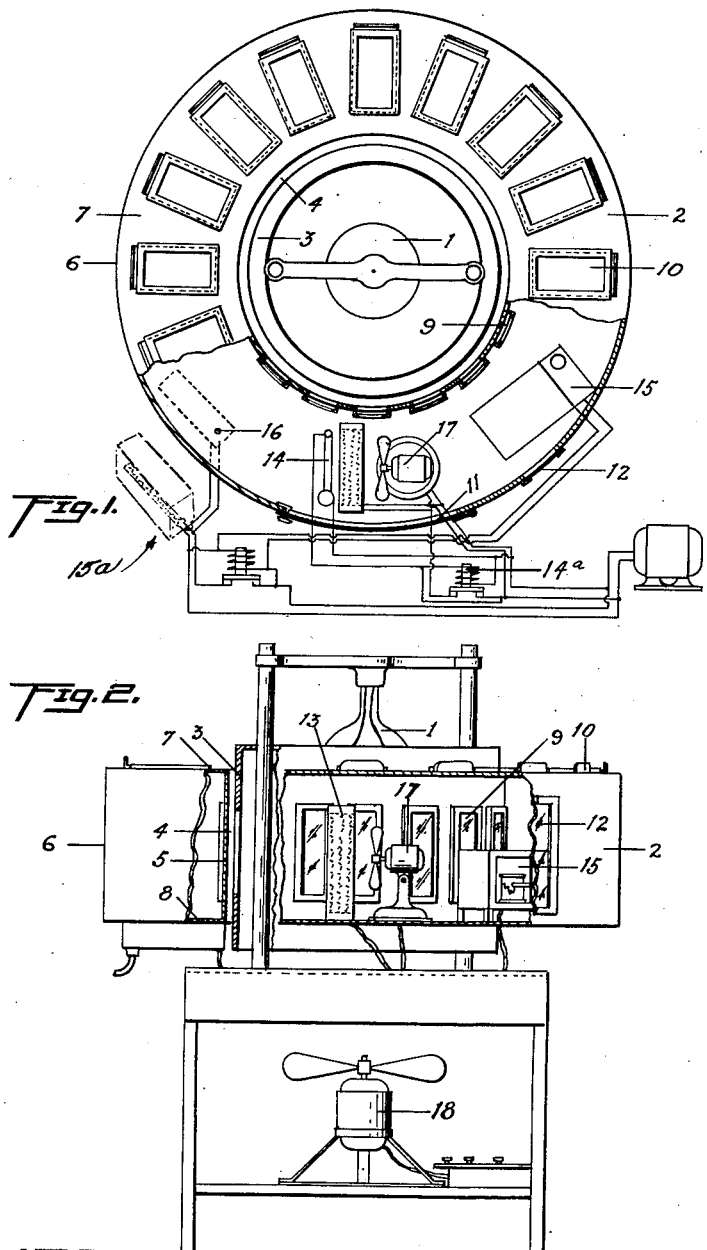

1,969,606

UNITED STATES PATENT OFFICE 1,969,606

APPARATUS FOR TESTING THE FASTNESS TO LIGHT OF DYES, INKS, AND OTHER COLOR MATERIALS

Robert Oswald Hall, Toronto, Ontario, Canada, assignor to Ontario Research Foundation, Toronto, Ontario, Canada, a corporation of Ontario, Canada Application June 13, 1932, Serial No. 616,839

10 Claims. (Cl. 88—14)

This invention relates to an apparatus for testing the fastness to light of dyes, inks and other color materials which for convenience in terminology are hereinafter referred to as color materials.

It is well known that color materials are deleteriously affected by light, some to a greater degree than others, and although sunlight is one of the factors in effecting this deterioration of color materials, commonly known as fading, other factors such as humidity and temperature influence the rate at which color is destroyed by light. It has been clearly established that variations of the temperature and the relative humidity in the air surrounding the color material exposed to the action of sunlight has a pronounced effect on the rate at which the color is destroyed. Of these two factors, namely, temperature and humidity, in general variations of humidity have a greater effect in this destruction, that is, for increases in the relative humidity, the temperature being constant, the rate of destruction is greater than for increases in temperature without a corresponding increase in the relative humidity but the reverse may be true for some color materials. These three factors, namely, sunlight, temperature and humidity vary for different localities so that a dye which will be suitable for one locality may be unsuitable for another locality having different climatic conditions.

It is essential in manufacturing color materials to test their resistance to the deteriorating action of these factors and to ascertain the rate at which the color is destroyed under certain specified conditions so that it may be determined whether the color material is suitable for use in a specified locality or under certain specified conditions. Natural sunlight is unsuitable for this purpose due to variations in solar radiations, shifting position of the sun, changing atmospheric conditions, and variations in the climatic conditions of different localities. For these reasons it has become the practice, in testing the fastness to light of color materials, to use an artificial light as its intensity may be maintained constant. The light to be used must be one which will produce a radiation which will be the approximation of sunlight and for this reason a carbon arc lamp is a very suitable source of light.

In devices heretofore used for testing the rate at which color materials are destroyed employing an artificial source of light, no adequate provision has been made for controlling the temperature or relative humidity of the air in contact with the color materials under test. In these devices the temperature of the air in contact with the material was dependent on the intensity of the radiations from the lamp and to some extent on the temperature of the room in which the apparatus is used. These two factors varied according to the circumstances under which such apparatus was used causing variations in the temperature of the air in contact with the material being tested. It has also been proposed to humidify the air in contact with the color materials but in none of these devices has any provision been made for controlling the relative humidity.

It will be apparent that with such apparatus the conditions under which the test is being carried on will not remain constant, that is, as the temperature varies there will be corresponding variations in the relative humidity and thereby it will be impossible to obtain standardized results.

The object of this invention is to so design the apparatus for testing the fastness to light of color materials that the conditions under which the testing is carried on can be maintained constant for the required standard of temperature and humidity to which they would be subject in actual service so that the suitability and serviceability of the color material may be determined. With this object in view I have so constructed the apparatus that the temperature and humidity of the air in contact with the material under test can be maintained constant throughout the whole period irrespective of fluctuations in the temperature or humidity of the air in the room where the apparatus is in use.

For an understanding of the invention and the manner in which it is carried out and employed reference is to be had to the following description and accompanying drawing in which:—

Fig. 1 is a plan view partly in section of an apparatus constructed according to this invention; and Fig. 2 is a front view partly in section of the apparatus shown in Fig. 1.

Like characters of reference refer to like parts throughout the specification and drawing.

The apparatus comprises an arc lamp 1, an annular tunnel 2 constructed of metal concentric with the arc lamp 1, a screen 3 interposed between the arc lamp and the tunnel and forming therewith a channel 4 wide enough to permit of a rapid stream of air moving vertically between the screen and the tunnel, a width of from one to two inches is a satisfactory spacing. The air is circulated through the channel by means of a suitable fan or blower 18 located either above or below the arc lamp. The annular tunnel consists of a top 7, bottom 8, outer wall 6 and an inner wall 5 which is provided with a plurality of spaced windows 9 of sufficient size to permit a sample of color material being exposed therethrough to the radiations of the arc lamp. It is essential to cover the windows with a transparent substance which will permit all the rays from the arc lamp to pass through, particularly the fading rays, and for this purpose glass capable of transmitting actinic light is a suitable material. When the screen is constructed of opaque material apertures are formed therein corresponding in size and number with the windows 9 and in alignment therewith. The top of the tunnel is provided with a plurality of doors or hatchways 10 corresponding in number to, and location with, the windows 9 to give access to the material being tested. The material to be tested is suitably mounted in a sample holder located or positioned within the tunnel about one inch from the windows and parallel thereto. The outer wall of the tunnel is provided with an airtight or nearly airtight door 11 and an observation window 12.

The screen which is interposed between the arc lamp and the tunnel is adapted to shield the tunnel so that the direct radiations from the source of light will fall only on the material being tested, thereby reducing the amount of heat received by the tunnel making it possible to maintain and control the temperature of the air within the tunnel at approximately atmospheric temperature. I have found in actual practice that when the room temperature is 85° F. only sufficient heat passes to the tunnel to raise the temperature within the tunnel 15° F. above the temperature of the room in which the apparatus is being operated. That is, when the room temperature is 85° F. the temperature in the tunnel is 100° F. I have also ascertained that when the room temperature is 71° F. and 78° F. the temperature in the tunnel is 82° F. and 91° F. respectively. The room temperature will not remain constant but will fluctuate in varying degrees from time to time causing corresponding fluctuations within the tunnel unless some means are provided whereby the temperature of the air in contact with the exposed material can be raised to and maintained constantly at the same temperature during the whole testing period unaffected by variations in the temperature of the room in which the apparatus is being operated.

This is accomplished by providing within the tunnel an electric heater 13 which should have a small heat capacity and a large surface area in proportion to its mass. A suitable heater consists of a spiral of resistance wire strung back and forth on an insulated frame across the tunnel and is controlled by a thermo-regulator, diagrammatically illustrated at 14, which automatically maintains the air within the tunnel at the desired temperature with a variation not exceeding 1° F. The thermo-regulator operates a relay 14a which opens and closes the circuit to the heater.

The relative humidity within the tunnel is controlled by means of a hygrometer, diagrammatically shown at 15, which may be any of the well known types provided that its operation is not affected by the air current within the tunnel and that it is capable of making or breaking an electrical circuit when the relative humidity of the air deviates from the desired mean value. It is preferable to have the hygrometer so designed that it will make or break the electrical circuit on variations of one half of one per cent. By means of well known electric circuits the hygrometer can be utilized to control a water evaporator or atomizer for humidifying the air within the tunnel. A water evaporator is diagrammatically illustrated at 15a and is located exteriorly of the tunnel and the water vapor or mist which it generates enters the tunnel as required to maintain the humidity constant through a small aperture 16 formed in the bottom of the tunnel near the outer wall and so located that the thermo-regulator is between the heater and the aperture. The air within the tunnel is circulated by means of a fan or blower 17 located between the hygrometer and the heater and in close proximity to the heater thereby maintaining the whole of it at the same temperature and humidity.

The operation of the device is as follows:—The color materials to be tested are inserted in the sample holders, the arc lamp lit, the fan for circulating the air through the channel is started, the hygrometer and thermo-regulator set for the required humidity and temperature and the fan for circulating the air within the tunnel is put in operation.

With this apparatus the temperature and humidity within the tunnel may be maintained constant throughout the whole testing period unaffected by variations in the temperature or humidity of the room in which the apparatus is being operated. It is to be understood that the temperature within the tunnel has to be maintained at a temperature higher than the room temperature for the reasons hereinbefore set out.

While I have described one particular construction it is not intended to limit the scope of this invention to the particular design shown as it will be apparent that many modifications may be made without departing from the novel features as set out in the appended claims.

Having thus fully described my invention what I claim as new and desire to secure by Letters Patent is:

1. An apparatus for testing the fastness to light of color materials comprising, in combination, an artificial source of light, the radiations of which are an approximation of the radiations from the sun, an annular tunnel concentric with the source of light, having a plurality of spaced windows formed in the inner wall thereof and having located therein an electric heater controlled by a thermo-regulator for heating the air in the tunnel and maintaining it at a predetermined temperature, means for supporting the color material in alignment with the windows, means for maintaining a circulation of the air in the tunnel and an evaporator controlled by a hygrometer in said tunnel for humidifying the air and maintaining it at a predetermined relative humidity.

2. An apparatus for testing the fastness to light of color materials comprising, in combination, an artificial source of light, the radiations of which are an approximation of the radiations from the sun, an annular tunnel concentric with the source of light, having a plurality of spaced windows formed in the inner wall thereof and having located therein, means for heating the air and maintaining it at a predetermined temperature, means for humidifying the air and maintaining it at a predetermined relative humidity, means for supporting the color material in alignment with the windows, a fan for maintaining the circulation of the air; a screen interposed between the tunnel and the source of light forming a channel between the screen and the tunnel and adapted to shield the tunnel so that the direct radiation from the source of light will fall only on the material being tested.

3. An apparatus for testing the fastness to light of color materials comprising, in combination, an artificial source of light, the radiations of which are an approximation of the radiations from the sun, an annular tunnel concentric with the source of light, having a plurality of spaced windows formed in the inner wall thereof and having located therein, means for heating the air and maintaining it at a predetermined temperature, means for humidifying the air and maintaining it at a predetermined relative humidity, means for supporting the color material in alignment with the windows, a fan for maintaining the circulation of the air, a screen interposed between the tunnel and the light forming a channel between the screen and the tunnel and adapted to shield the tunnel so that the direct radiation from the source of light will fall only on the material being tested, and means for maintaining a rapid circulation of air through said channel reducing the minimum temperature at which the tunnel can be operated.

4. An apparatus for testing the fastness to light of color materials as claimed in claim 2 in which the means for heating the air and maintaining it at a predetermined temperature comprises an electric heater controlled by a thermo-regulator and the means for humidifying the air and maintaining it at a predetermined relative humidity consists of an evaporator controlled by a hygrometer.

5. An apparatus for testing the fastness to light of color materials comprising, in combination, an artificial source of light, the radiations of which are an approximation of the radiations from the sun, an annular closed tunnel concentric with the source of light, having a plurality of spaced windows formed in the inner wall thereof facing the source of light, said tunnel having located therein means for heating the air and maintaining it at a predetermined temperature, means for humidifying the air and maintaining it at a predetermined relative humidity, a fan for maintaining the circulation of the air and means for supporting the color material in alignment with windows, a screen interposed between the tunnel and the source of light adapted to shield the tunnel so that radiations from the source of light will fall only on the material being tested.

6. An apparatus for testing the fastness to light of color materials comprising, in combination, an artificial source of light, an annular closed tunnel concentric with the source of light having a plurality of windows formed in the inner wall thereof, means for supporting the color material in alignment with said windows, and a screen interposed between the tunnel and the source of light adapted to shield the tunnel from radiations from the source of light other than those radiations which fall on said windows.

7. An apparatus for testing the fastness to light of color materials as defined in claim 6, comprising means for forcing a current of air between the screen and the wall of the tunnel.

8. An apparatus for testing the fastness to light of color materials as defined in claim 6, comprising means for maintaining the air in the tunnel at a constant predetermined temperature and relative humidity.

9. An apparatus for testing the fastness to light of color materials comprising, in combination, a source of light, an annular tunnel concentric with the source of light, having a plurality of spaced windows formed in the inner wall thereof, means for heating the air in the tunnel and maintaining it at a predetermined temperature, means for humidifying the air in the tunnel and maintaining it at a predetermined relative humidity, means for supporting the color materials in the tunnel in alignment with the windows and means for maintaining a circulation of the air in the tunnel.

10. An apparatus as defined in claim 9 comprising means for shielding the tunnel from radiations from the source of light other than those which fall on said windows.

ROBERT OSWALD HALL.